United States Patent [19]

Hogan et al.

[11] 4,014,816
[45] Mar. 29, 1977

[54] SILANE ADJUVANT FOR CHROMIUM OXIDE CATALYST

[75] Inventors: John P. Hogan; Benny E. Nasser, both of Bartlesville; Joseph A. Delap, Dewey, all of Okla.

[73] Assignee: Phillips Petroleum Company, Bartlesville, Okla.

[22] Filed: Oct. 16, 1975

[21] Appl. No.: 623,123

Related U.S. Application Data

[62] Division of Ser. No. 526,158, Nov. 22, 1974, Pat. No. 3,939,137.

[52] U.S. Cl. ............................. 252/430; 526/335; 526/348
[51] Int. Cl.$^2$ ............... B01J 31/02; C08F 210/00; C08F 110/02
[58] Field of Search .................................... 252/430

[56] References Cited

UNITED STATES PATENTS

| 3,715,321 | 2/1973 | Horvath | 252/430 X |
| 3,879,368 | 4/1975 | Johnson | 252/430 X |
| 3,936,431 | 2/1976 | Reginato et al. | 252/430 X |

FOREIGN PATENTS OR APPLICATIONS

| 1,923,998 | 2/1970 | Germany | 252/430 |
| 1,023,647 | 3/1966 | United Kingdom | 252/430 |

Primary Examiner—Patrick P. Garvin
Assistant Examiner—William G. Wright

[57] ABSTRACT

Olefins are polymerized with a catalyst which forms on mixing a supported chromium oxide composite and a silane adjuvant. This system allows the production of polymer of a given melt index at a higher temperature, thus increasing the production rate and is of particular utility in solution polymerizations designed to produce ethylene polymers and copolymers.

6 Claims, 2 Drawing Figures

SILANE ADJUVANT FOR CHROMIUM OXIDE CATALYST

CROSS-REFERENCE TO RELATED APPLICATION

This application is a division of application Ser. No. 526,158, filed Nov. 22, 1974, now U.S. Pat. No. 3,939,137.

BACKGROUND OF THE INVENTION

This invention relates to the production of olefin polymers with a supported chromium oxide catalyst.

In the production of olefin polymers utilizing a solution process the production rate, that is, the pounds of polymer produced per unit of time per reactor, is limited by the viscosity of the polymerization medium. Thus, when the amount of polymer reaches a certain level, the viscosity of the polymer solution becomes too great to be handled by the filters and centrifuges. As a general proposition, the melt index of the polymer being produced varies with temperature, higher melt index (lower molecular weight) polymer being produced at the higher temperatures. Thus, this problem cannot be solved simply by raising the temperature since this produces a different polymer. Greater production rates could be obtained if polymer of a given melt index could be produced at a higher temperature since this would allow a greater concentration of polymer in the solution. It is further desirable to operate at a higher temperature so as to improve the efficiency of heat removal during the polymerization. Also higher reactor effluent temperature improves catalyst removal and solvent removal efficiency.

SUMMARY OF THE INVENTION

It is an object of this invention to allow operation of an olefin polymerization process at a higher temperature;

it is a further object of this invention to provide a catalyst which gives a lower melt index for a given polymerization temperature;

it is yet a further object of this invention to produce polymer of a given melt index at a relatively higher temperature;

it is still yet a further object of this invention to increase the production rate of an olefin polymerization process;

it is yet a further object of this invention to operate an olefin polymerization process at a higher polymer concentration;

it is still yet a further object of this invention to improve heat transfer during polymerization;

it is still yet a further object of this invention to improve catalyst removal and solvent removal efficiency;

it is still yet a further object of this invention to produce polymer having a broader molecular weight distribution; and it is still yet a further object of this invention to provide an improved olefin polymerization catalyst.

In accordance with this invention, a silane is introduced into an olefin polymerization system utilizing a supported chromium oxide catalyst.

BRIEF DESCRIPTION OF THE DRAWINGS

In the drawings, forming a part hereof.

DESCRIPTION OF THE PREFERRED EMBODIMENTS

Figure 1:
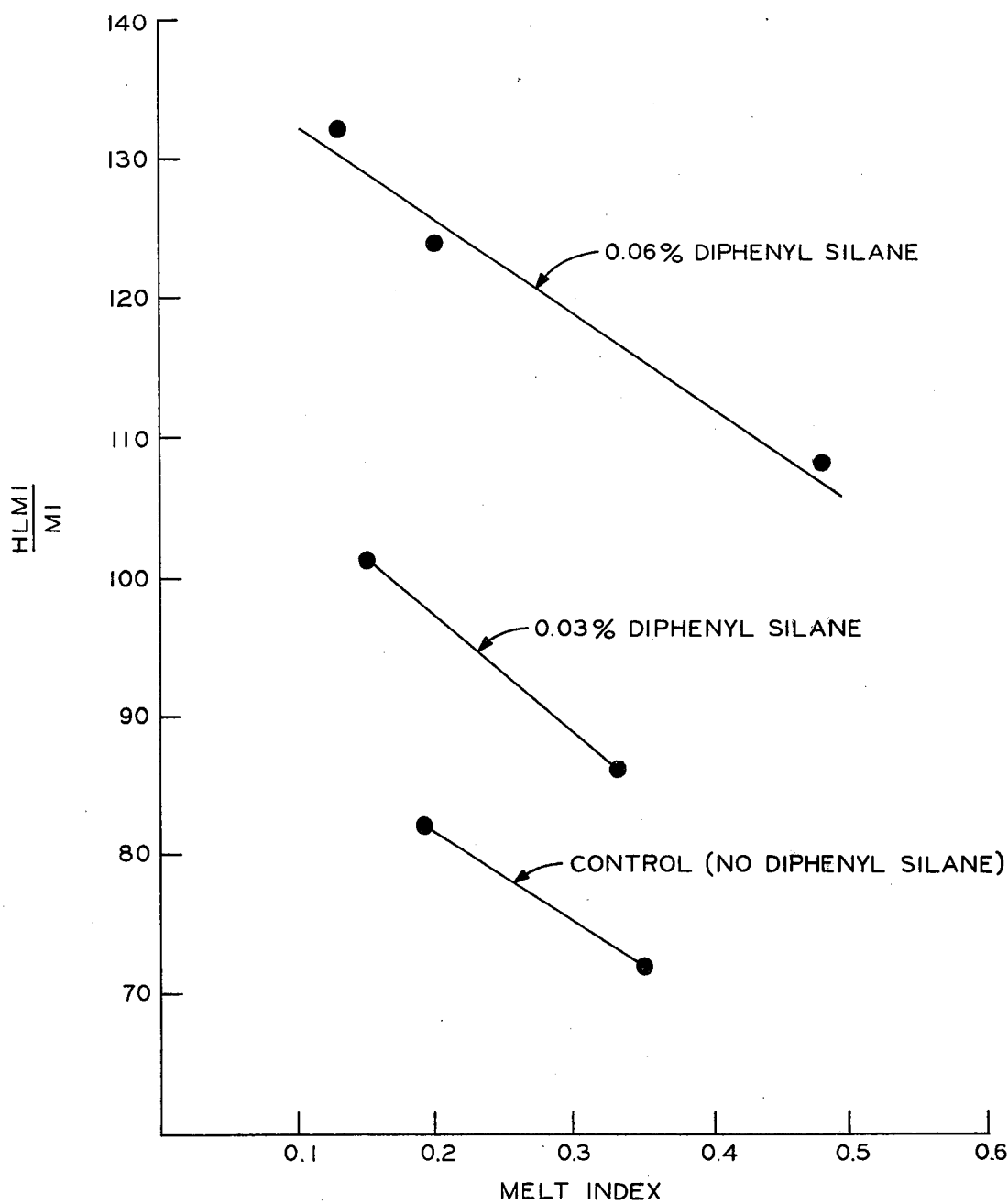
FIG. 1 is a plot showing the relationship of HLMI/MI ratio to melt index for polymers made with and without the added presence of a silane in the polymerization reactor.

The base or support for the chromium oxide portion of the catalyst system of this invention can be any conventional silicon-containing material such as silica, silica-alumina, silica-titania, and the like. The supports are particulate in nature and they can be prepared by precipitation and coprecipitation techniques, or by mixing silica with other refractory materials.

For example, sodium silicate can be added to an acid such as sulfuric acid, the resulting precipitate aged for at least 1 hour, and water-soluble salts removed by washing with water to thus produce an alkali metal-free hydrogel. Alkali metal ion can be more rapidly removed if the wash water contains an ammonium salt. The water is then removed by spray drying a water-hydrogel slurry or by drying in a conventional tray-dryer. Silica generally constitutes the major portion of the support with other metal compounds when used making up from 0.1 to about 20 weight percent of the finished support.

Supports can be produced by coprecipitating an alkali metal silicate solution such as water glass and titanium or aluminum compounds such as titanyl sulfate or aluminum sulfate by adding said silicate to a mineral acid such as sulfuric acid, said acid containing said titanium or aluminum compound, to form a hydrogel. The hydrogel is preferably aged for a time of at least 1 hour. This hydrogel can then be treated in the manner described above to form the corresponding silica-titania or silica-alumina gel.

The support contains about 0.1 to 10, preferably 0.5 to 4 weight percent of chromium calculated as chromium oxide ($CrO_3$) based on the weight of the total support plus chromium oxide. The chromium can be added to the support in any manner known in the art such as impregnation with an aqueous solution of a chromium compound such as chromium oxide or chromium nitrate which is convertible to chromium oxide on calcination. Alternatively, a hydrocarbon solution of a chromium compound convertible to chromium oxide can also be used to impregnate the support. Alternatively, silica can be coprecipitated with a chromium compound or a chromium compound physically mixed with the support.

This chromium-containing support is then activated by calcining. Preferably this is done by heating at a temperature within the range of 700–2000, preferably 900°–1700° F for a time within the range of ½ to 50, preferably 1 to 10 hours in an oxygen-containing atmosphere such as dry air to convert at least a part of the chromium to the hexavalent state. Preferably this is carried out in a stream of fluidizing air which stream of fluidizing air is continued as the material is cooled.

The silanes of this invention have the structure $R_{4-n}SiH_n$ wherein $n$ is an integer from 0 to 3 and R is a saturated or unsaturated hydrocarbon group containing from 1 to 10 carbon atoms per molecule selected from alkyl, alkenyl, aryl, and cycloalkyl groups or combinations thereof such as aralkyl and alkaryl. The silane may contain different R groups. Exemplary compounds include triethylsilane, tetraethylsilane, phenylsilane, diphenylsilane, diphenyl(methyl)silane, dibenzylsilane, tribenzylsilane, triphenylsilane, di-1-naphthylsilane, triallylsilane, ditolylsilane, and the like.

The amount of silane used to treat the catalyst is in the range of about 0.001 to about 10 weight percent, preferably about 0.01 to about 6 weight percent based on the weight of the total catalyst, that is, the support plus the chromium compound and excluding the silane. The silane may contact the catalyst prior to charging the catalyst to the reactor or may be added as a separate stream to the reactor prior to initiating polymerization. Generally, the silane is added in a hydrocarbon solution, the hydrocarbon usually being the same as the solvent contained in the reactor but it is not restricted to that solvent. Dilute solutions, i.e., about 0.005 to about 1 weight percent are conveniently used when passing the silane solution to the reactor. More concentrated solutions can be used when pretreating the catalyst but it is desirable to thoroughly mix the silane solution with the catalyst with vigorous stirring.

Catalyst concentrations in the reactor are conventional and are in the range of about 0.001 to about 10 weight percent based on the weight of the reactor contents. The reactor conditions of pressure and temperature are conventional for the solution process used in this invention except that the treated catalysts of this invention permit considerably higher temperatures to be used to produce a given melt index polymer, compared to the untreated controls. Generally temperatures of 230° to 350° F are used. For example, an increase of about 10°–35° F in reactor temperature is required to make a 0.2 melt index ethylene homopolymer over a catalyst treated with 0.03 to 0.06 weight percent of diphenyl silane as compared with the temperature required to give the same melt index with the same catalyst not treated with the silane.

The catalyst system of this invention is particularly useful for the preparation of normally solid polymers of at least one mono-1-olefin having 2–8 carbon atoms per molecule preferably polymers of ethylene or copolymers of ethylene with another mono-1-olefin containing 3 to 8 carbon atoms per molecule. As an example, the olefin polymer can be produced from at least one aliphatic mono-1-olefin having 2 to 8 carbon atoms per molecule. Exemplary copolymers include those of ethylene/propylene, ethylene/1-butene, ethylene/1-hexene, ethylene/1-octene and the like. The major portion of such copolymers is derived from ethylene and generally consists of about 80–99, preferably 95–99 mole percent of ethylene.

Suitable solvents for the polymerization medium include hydro-carbons having 3 to 12 carbon atoms per molecule such as paraffins, cycloparaffins, and aromatics with the paraffinic hydrocarbons being more preferred. Exemplary solvents include n-butane, isobutane, n-pentane, isopentane, n-hexane, n-heptane, 2,2,4-trimethylpentane, cyclopentane, cyclohexane, methylcyclohexane, n-dodecane and mixtures thereof. Generally a pressure of 0 to 2000 psig is utilized, preferably about 50 to 750 psig, this pressure being sufficient to maintain the solvent in liquid phase.

Thus, in accordance with the invention, olefin polymers are produced, preferably in a solution process with the amount of polymer of a given melt index per reactor being increased by using the catalyst system of this invention. Increase is achieved by utilizing as an adjuvant the hydrocarbyl-substituted silane which increases the capability of the catalyst to produce higher molecular weight polymer (lower MI) at a given reactor temperature, i.e., the resulting polymers have a lower melt index at the same reactor temperature when made in the presence of the silane than in the absence of the silane. Therefore, the silane-treated catalyst permits a higher reactor temperature to be used to produce a given melt index polymer, compared to an untreated catalyst, with the result that the viscosity of the solution of the polymer at a given polymer concentration is reduced. This is turn permits operating at higher polymer concentrations and therefore higher plant production rates. The higher solids level coupled with a decreased viscosity of the solution due to operating at somewhat higher reactor temperatures also allows greater efficiency in heat removal during polymerization. The higher temperature of reactor effluent also improves catalyst removal and solvent removal efficiency.

Although the increase in polymer production applies to any melt index polymer made in the solution process, it is of particular interest in producing blow molding grade polymers having melt indexes ranging from about 0.1 to about 1.5. The reason for this is that such polymer solutions have relatively high viscosities at the reactor conditions employed to make them in the absence of this invention and reactor temperature cannot be raised to lower the solution viscosities without raising the melt index of the polymers.

A secondary effect obtained by using the silane-treated catalysts is the production of somewhat broader molecular weight distribution polymers at a given melt index than those polymers produced with no silane treatment of the catalysts. The polymers prepared according to this invention, particularly those exhibiting a melt index of about 0.1 to 1, are useful for blow molding applications because they possess good shear response at the molding conditions and the molded articles have good environmental stress cracking resistance.

EXAMPLE 1

Ethylene homopolymers were prepared using the catalysts prepared as described below.

The base catalyst consisted of microspheroidal silica having a surface area of about 700 square meters per gram and a pore diameter of about 50–70 Angstroms impregnated with sufficient chromium trioxide to give approximately 0.7 percent chromium content based on the weight of the composite. The catalyst of each run was activated by heating it for 5 hours in dry air at 1000° F. In the following Table, MI means melt index of the polymer as determined by ASTM D1238-62 condition E, HLMI means high load melt index as determined by ASTM D1238-62 condition F, the HLMI/MI ratio is a measure of molecular weight distribution of the polymer, the higher the value the broader the molecular weight distribution and productivity is expressed in pounds polymer made per pound catalyst. Each polymerization run was conducted in a 1.3 liter stirred reactor containing ¾ pound (340.2 gms) of cyclohexane as solvent. Ethylene pressure was 450 psig, each run was one hour in length and the catalyst used per run ranged from about 0.09 to 0.13 gms (about 0.026 to 0.038 weight percent based on reactor contents at start of reaction). The silane, when used, was passed to the reactor prior to start of polymerization in a separate stream dissolved in cyclohexane (about 0.01 weight percent) to give the amount of silane (diphenylsilane in each instance) used based on the weight of catalyst. Ethylene homopolymer was prepared in each run. The results are presented in Table 1.

Table 1

| Run No. | Wt. % Silane | Ethylene Polymerization | | | Catalyst Productivity lb/lb |
|---|---|---|---|---|---|
| | | Reactor Temp.,° F | Polymer MI | HLMI MI | |
| 1 | 0 | 275 | 0.19 | 82 | 1000 |
| 2 | 0 | 285 | 0.35 | 72 | 1200 |
| 3 | 0.03 | 285 | 0.15 | 101 | 800 |
| 4 | 0.03 | 295 | 0.33 | 86 | 870 |
| 5 | 0.06 | 300 | 0.13 | 132 | 553 |
| 6 | 0.06 | 310 | 0.20 | 124 | 460 |
| 7 | 0.06 | 320 | 0.48 | 108 | 430 |
| 8 | 4.0 | 285 | 0.04 | 116 | 253 |

Inspection of the data show in control runs 1 and 2 that the melt index increases from 0.19 to 0.35 as the reactor temperature is increased from 275° F to 285° F. When 0.03 weight percent diphenyl silane was present during polymerization, the data reveal that the reactor temperature required to make polymer of similar melt index (control run 1 vs invention run 3 and control run 2 vs invention run 4) was 10° F higher in the presence of the silane. Similarly, when the quantity of silane was doubled, the effect on reactor temperature required to make polymer of similar melt index compared to that made in the absence of silane was even more pronounced. Comparison of control run 1 with invention runs 5 and 6 show that the reactor temperature can be about 25°–35° F higher and still make polymer having a melt index of about 0.2 because of the presence of the silane. A similar spread in reactor temperature is seen for control run 2 and invention run 7 for polymers having higher melt index values. In all of the invention runs 3–7, comparing with polymers of similar melt index made in the absence of the silane, the molecular weight distribution of the polymers is broadened in the presence of silane-treated catalysts as shown by the higher HLMI/MI values in those runs. Also, the HLMI/MI values of polymers of similar melt indexes increases with the increasing silane content, as is shown in runs 1, 3 and 6 and in runs 2, 4 and 7. Run 8 shows the effect of substantially increasing the amount of silane upon polymer melt index, and HLMI/MI ratio in comparison to control run 2 at the same reactor temperature and invention run 3 at the same reactor temperature with 0.03 weight percent silane in the reactor.

Productivity of the catalyst in terms of pounds polymer produced per pound of catalyst used should not be confused with production of polymer per day per reactor which depends upon how much polymer is recovered from the solution and this factor is related to polymer solubility which is temperature dependent. Thus, high polymer production rates can be achieved with low productivity catalyst by increasing the amount of catalyst used. For a given melt index, higher production rates are achieved in accordance with the invention because of the higher temperature used.

Figure 2:
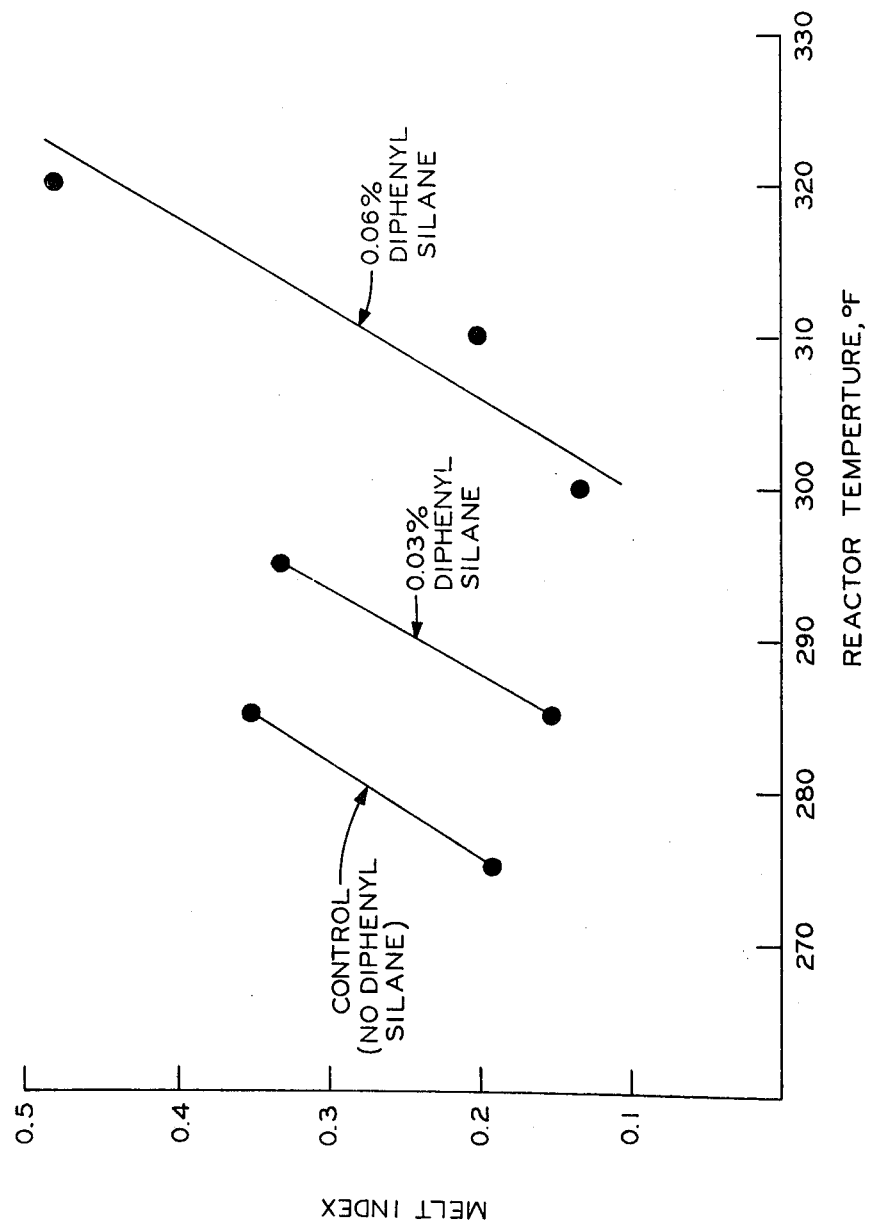
FIG. 2 is a similar plot showing the relationship of melt index to reactor temperature.

FIG. 1, showing the effect of diphenylsilane-treated catalyst on HLMI/MI ratio of polymers produced with it, and FIG. 2, showing the effect of the silane-treated catalyst on the reactor temperatures needed to produce a polymer in the melt index range given are plotted from the data given in Table 1. The Figures clearly demonstrate the beneficial effects resulting from the use of the silane-treated catalysts of this invention on reactor temperature requirements and the broadening of the molecular weight distribution of polymers produced over the catalysts.

Although ethylene homopolymers are shown in the Example, the catalysts of this invention can obviously be used to prepare copolymers of ethylene with other aliphatic 1-olefins having from 3–8 carbon atoms per molecule since the catalysts of the controls are known in the art to have this capability.

While this invention has been described in detail for the purpose of illustration, it is not to be construed as limited thereby but is intended to cover all changes and modifications within the spirit and scope thereof.

What is claimed is:

1. A catalyst which is prepared by mixing a calcined support containing chromium in the form of chromium oxide at least a part of said chromium being in the hexavalent state and a silane of the formula $R_{4-n}SiH_n$ wherein $n$ is an integer from 0 to 3 and R is a saturated or unsaturated hydrocarbon group containing from 1 to about 10 carbon atoms per molecule selected from alkyl, alkenyl, aryl, aralkyl, alkaryl, and cycloalkyl.

2. A catalyst according to claim 1 wherein said contacting is carried out in the presence of a hydrocarbon solvent.

3. A catalyst according to claim 1 wherein said support comprises silica.

4. A catalyst according to claim 1 wherein said silane is diphenylsilane.

5. A catalyst according to claim 1 wherein said silane is present in an amount within the range of 0.001 to 10 weight percent based on the weight of said support containing chromium.

6. A catalyst according to claim 5 wherein said silane is diphenylsilane and is present in an amount within the range of 0.01 to 6 weight percent based on the weight of said support containing chromium.

* * * * *